United States Patent [19]

Kokubu

[11] Patent Number: 4,782,256
[45] Date of Patent: Nov. 1, 1988

[54] ELECTRICITY GENERATOR FOR WHEEL DETECTION

[75] Inventor: Sadao Kokubu, Aichi, Japan

[73] Assignee: Kabushiki Kaisha Tokai Rika Denki Seisakusho, Japan

[21] Appl. No.: 90,543

[22] Filed: Aug. 28, 1987

[30] Foreign Application Priority Data

Aug. 30, 1986 [JP] Japan .................. 61-132869[U]

[51] Int. Cl.$^4$ .................. H02K 21/22; H02K 7/18
[52] U.S. Cl. ........................ 310/83; 74/206; 310/67 A
[58] Field of Search ............. 74/206, 789, 798; 310/46, 67 A, 83, 156, 208

[56] References Cited

U.S. PATENT DOCUMENTS 4,291,248  9/1981  Rainbolt .................. 310/46
4,435,998  3/1984  Kinoshita ................ 74/206

FOREIGN PATENT DOCUMENTS 490551  2/1953  Canada .................. 310/67 A
918402  2/1947  France .................. 310/67 A
265700  3/1947  Switzerland ............ 310/67 A Primary Examiner—Patrick R. Salce
Assistant Examiner—D. L. Rebsch
Attorney, Agent, or Firm—Finnegan, Henderson, Farabow, Garrett and Dunner

[57] ABSTRACT

An electricity generator is attached to a rotating body having a case secured thereto. The case houses a plurality of rotary members which cannot revolve around the axis of the case but are rotated around their own axes as the case is rotated. A permanent magnet is supported by the rotary members and is rotated in a direction opposite to the direction of rotation of the case. A coil attached to the case generates an alternating current when the permanent magnet is rotated.

2 Claims, 2 Drawing Sheets

ELECTRICITY GENERATOR FOR WHEEL DETECTION

FIELD OF THE INVENTION

The present invention relates to an electricity generator attached to a rotating body.

BACKGROUND OF THE INVENTION

A detector, which detects such conditions of a wheel of a motor vehicle as the decrease in the air pressure of a tire on the wheel and the wear of the tire and then gives a warning, has been proposed. The detector, which rotates together with the wheel, needs a power supply such as a dry cell, a solar cell, or an electricity generator comprising a permanent magnet on the side of the chassis of the motor vehicle and a coil on the side of the wheel. A dry cell used as the power supply has a drawback that the life of the dry cell is so short that the dry cell needs to be replaced at regular intervals. The use of a solar cell as the power supply has a drawback that the solar cell is affected by the weather and time of the day so that the solar cell cannot produce any electricity in rainy weather and at night. The difficulty with using an electricity generator as the power supply secured to a wheel is that is is difficult in assembling the electricity generator to adjust the positional relation between the permanent magnet and coil at the electricity generator because the chassis and wheel of the motor vehicle are coupled to each other by an elastic suspension.

OBJECTS AND SUMMARY OF THE INVENTION

Accordingly, it is an object of the present invention to provide an electricity generator that may be attached to a rotating body, is easy to assemble, has a long life and is not affected by the weather and the time of day.

The electricity generator of the present invention is characterized in that a case is attached to the rotating body and a plurality of rotary members are supported in contact with the inside circumferential surface of the case, so that the rotary members cannot be revolved around the axis of the case but are rotated around the axes of the rotary members as the case is rotated. A permanent magnet is supported by the rotary members so that the permanent magnet is rotated in a direction opposite to that of the rotation of the case, as the rotary members are rotated around the axes thereof. A coil is attached to the case so that an alternating current is caused to flow through the coil as the permanent magnet is rotated.

Since the permanent magnet is rotated in a direction opposite to that of the rotation of the case, the relative rotation speed between them is so high that sufficient alternating current is caused to flow through the coil by the magnetic flux of the permanent magnet even if the rotating body that rotates the case is slowly rotated.

Since the electricity generator is constituted as described above, the electricity generator has a long life, is easy to assemble and is not affected by the weather and the time of the day.

DETAILED DESCRIPTION

Figure 3:
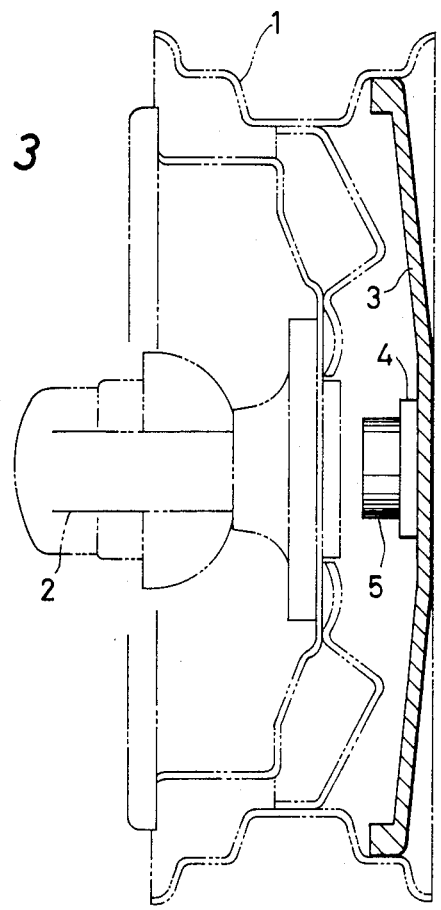
FIG. 3 shows a longitudinally sectional view of a wheel.

As shown in FIG. 3, a shaft 2 is coupled to the rim 1 of the wheel of a motor vehicle. A plastic hubcap 3, which is a rotating body, is attached to the rim 1. A circular attaching portion 4 is integrally formed on the inside surface of the central portion of the hubcap 3. A circular case 5 is secured to the attaching portion 4. The axis of the shaft 2 and that of the hubcap 3 are coincident with that of the case 5.

Figure 1:
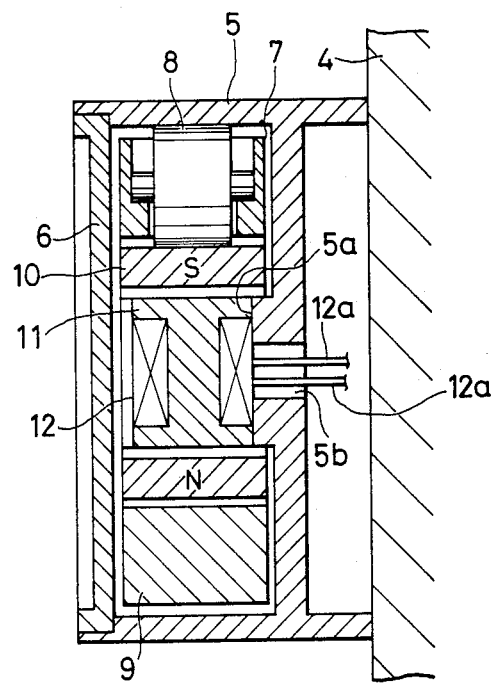
FIG. 1 shows a longitudinal sectional view of a major part of an electricity generator according to an embodiment of the present invention.

As shown in FIG. 1, the inner end portion of the case 5 is open, and an inward projection 5a is provided on the central portion of the wall of the case and has a lead wire insertion hole 5b. A cover 6 is fitted in the open inner end portion of the case 5.

Figure 2:
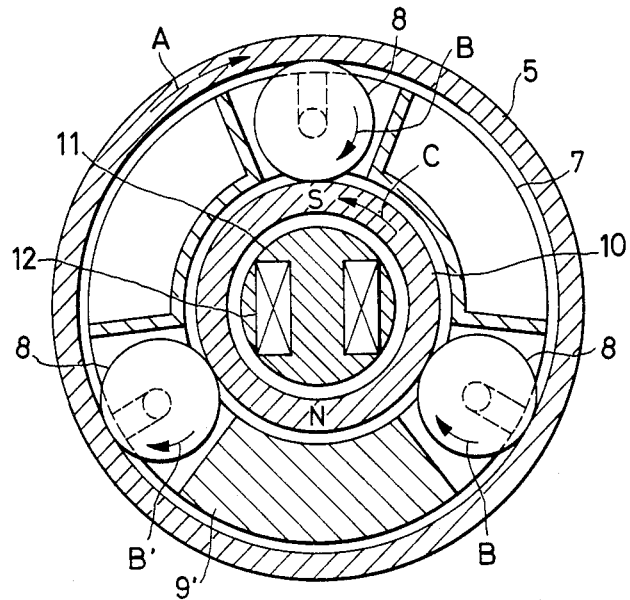
FIG. 2 shows a cross-sectional view of the major part of the electricity generator.

As shown in FIGS. 1 and 2, a hollow holder 7 is disposed in the case 5. Three rotary members 8 are supported at equiangular intervals by the holder 7 so that the rotary members 8 can rotate around the axes thereof. The peripheral portions of the rotary members 8 project out of the inside and outside circumferential portions of the holder 7 and are located in contact with the inside circumferential surface of the case 5. A weight 9 is attached to the lower portion of the holder 7 so that the holder is unrotatable and maintained substantially stationary. An annular permanent magnet 10, one half circumferential portion of which has a south pole and the other half circumferential portion of which has a north pole, is disposed in the case 5 in such a manner that the permanent magnet is supported on the outside circumferential surface thereof by the peripheral portions of the three rotary members 8. A core 11 is attached to the projection 5a of the case 5 and located in the permanent magnet 10. A coil 12 is provided on the core 11, and lead wires 12a connected to the coil 12 extend out through the lead wire insertion hole 5b of the projection 5a of the case 5.

Figure 4:
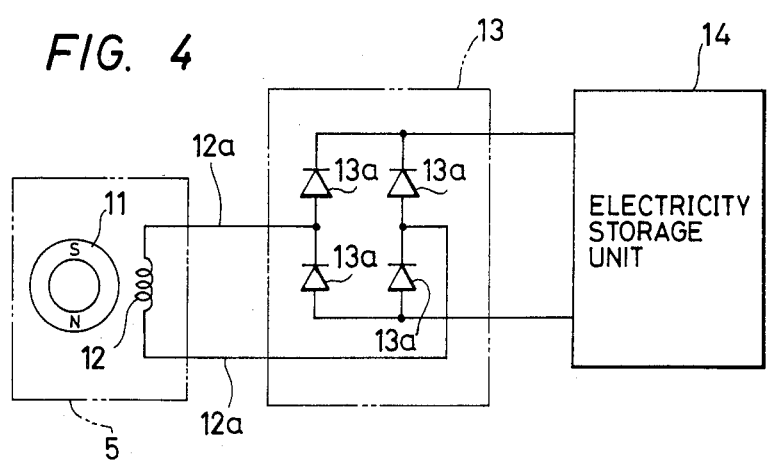
FIG. 4 shows an electric circuit diagram.

As shown in FIG. 4, the lead wires 12a are connected to the AC input terminals of a rectifying circuit 13 which comprises four diodes 13a connected together in a bridge and whose DC output terminals are connected to the terminals of an electricity storage unit 14.

The operation of the embodiment is now described. When the motor vehicle is started, the hubcap 3 is rotated together with the wheel of the vehicle so that the attaching portion 4 is rotated. As a result, the case 5 attached to the portion 4 is also rotated in a direction A so that the core 11 attached to the case and the coil 12 provided on the core are also rotated in the direction A. At that time, the three rotary members 8 located in contact with the inside circumferential surface of the case 5 are rotated around the axes of the rotary members in a direction B. Since the holder 7 is kept unrotatable or nearly stationary by the weight 9, the three rotary members 8 cannot revolve around the axis of the case 5. Since the three rotary members 8 are rotated around the axes thereof in the direction B, the permanent magnet 10 supported by the rotary members is rotated in a direction C opposite to the direction A. As a result, an alternating magnetic field is applied to the core 11 through the north and south poles of the permanent magnet 10 to cause an alternating current to flow through the coil 12. The alternating current is rectified by the rectifying circuit 13 whose rectified output is preserved in the electricity storage unit 14.

The DC power preserved in the electricity storage unit 14 is supplied to a tire air pressure detector (for example) as a load, which is provided on the wheel of the motor vehicle. A signal generated by the detector and indicating the air pressure of the tire of the wheel is transmitted by electric waves or the like to a receiver provided at the driver's seat of the vehicle. An indication, warning, or the like is given depending on the signal received by the receiver. The rectifying circuit 13 and the electricity storage unit 14 are located near the tire air pressure detector.

If it is supposed that the radius of the inside circumferential surface of the case 5, that of the outside circumferential surface of the permanent magnet 10 and the rotation speed of the case 5 are $r_1$, $r_2$, and N (rpm), respectively, the rotation speed n (rpm) of the permanent magnet is expressed as $n=(r_1/r_2)N$. Therefore, when the case 5 is rotated at the speed N (rpm) in the direction A, the permanent magnet 10 is rotated at the speed n (rpm) in the direction C opposite to the direction A, so that the relative rotation speed between the case and the permanent magnet is N+n (rpm). For that reason, even if the case 5 is slowly rotated, the velocity at which the core 11 intersects the magnetic flux of the permanent magnet 10 is high.

The holder 7 supporting the three rotary members 8 is disposed nearly stationary in the case 5, the permanent magnet 10 is supported by the rotary members and the core 11 and the coil 12 are attached to the projection 5a of the case and located in the permanent magnet, thereby comprising an electricity generator. As a result, the alternating current is caused to flow through the coil 12 by the magnetic flux of the permanent magnet 10 while the motor vehicle is moving. The alternating current is converted into DC power. Therefore, the life of the electricity generator is much longer than that of a dry cell so that the electricity generator does not need to be replaced often. Additionally, unlike a solar cell, the electricity generator is not affected by the weather and the time of day.

Unlike a conventional electricity generator comprising a permanent magnet and a coil, the electricity generator provided in accordance with the present invention can be easily assembled because the permanent magnet 10 and the coil 12 thereof are disposed in the same case 5.

Since the holder 7 and the permanent magnet 10 are supported by the three rotary members 8 in the case 5, so that only rolling friction acts on the holder, the permanent magnet and the rotary members, the durability of the electricity generator is high.

Since the permanent magnet 10 is rotated in the direction C, opposite to that A of the rotation of the case 5, the relative rotation speed between them is so high that the core 11 rapidly intersects the magnetic flux of the permanent magnet 10. Therefore, enough electricity is generated even if the case 5 is slowly rotated.

Although the rectifying circuit 13 and the electricity storage unit 14 are provided in the above-described embodiment, the output of the rectifying circuit may be directly supplied to a load or the alternating current of the coil 12 may be directly supplied to the load.

In the above-described embodiment, the case 5 may be made of a magnetic substance and the rotary members 8 may be made of permanent magnets.

The present invention is not confined to the above-described embodiment but may be otherwise embodied without departing from the character and spirit thereof. For example, the present invention may be applied to a rotating body which is not the hubcap of a motor vehicle.

What is claimed is:

1. An electricity generator comprising:
    a cylindrical case attached coaxially to a rotatable body having an inside circumferential surface and a central axis;
    a hollow relatively stationary annular holder inside of and adjacent to said case;
    a rotatable permanent magnet;
    a plurality of rotary members supported in contact with said inside circumferential surface equidistantly spaced so that said rotary members are rotated around individual axes of said rotary members distinct from the axis of said case as said case is rotated, said rotary members projecting beyond said hollow relatively stationary annular holder and supporting said permanent magnet to rotate said permanent magnet in a direction opposite to the direction of rotation of said case and at a rate of rotation greater than the rate of rotation of said case; and
    a coil centrally attached to said case and internally of said permanent magnet so that an alternating current is caused to flow through said coil as said permanent magnet is rotated.

2. An electric generator according to claim 1 further comprising:
    a weight fixedly attached to said hollow relatively stationary annular holder.

* * * * *